C. L. TOMLINSON.
WHEEL.
APPLICATION FILED APR. 3, 1912.
1,057,300.
Patented Mar. 25, 1913.
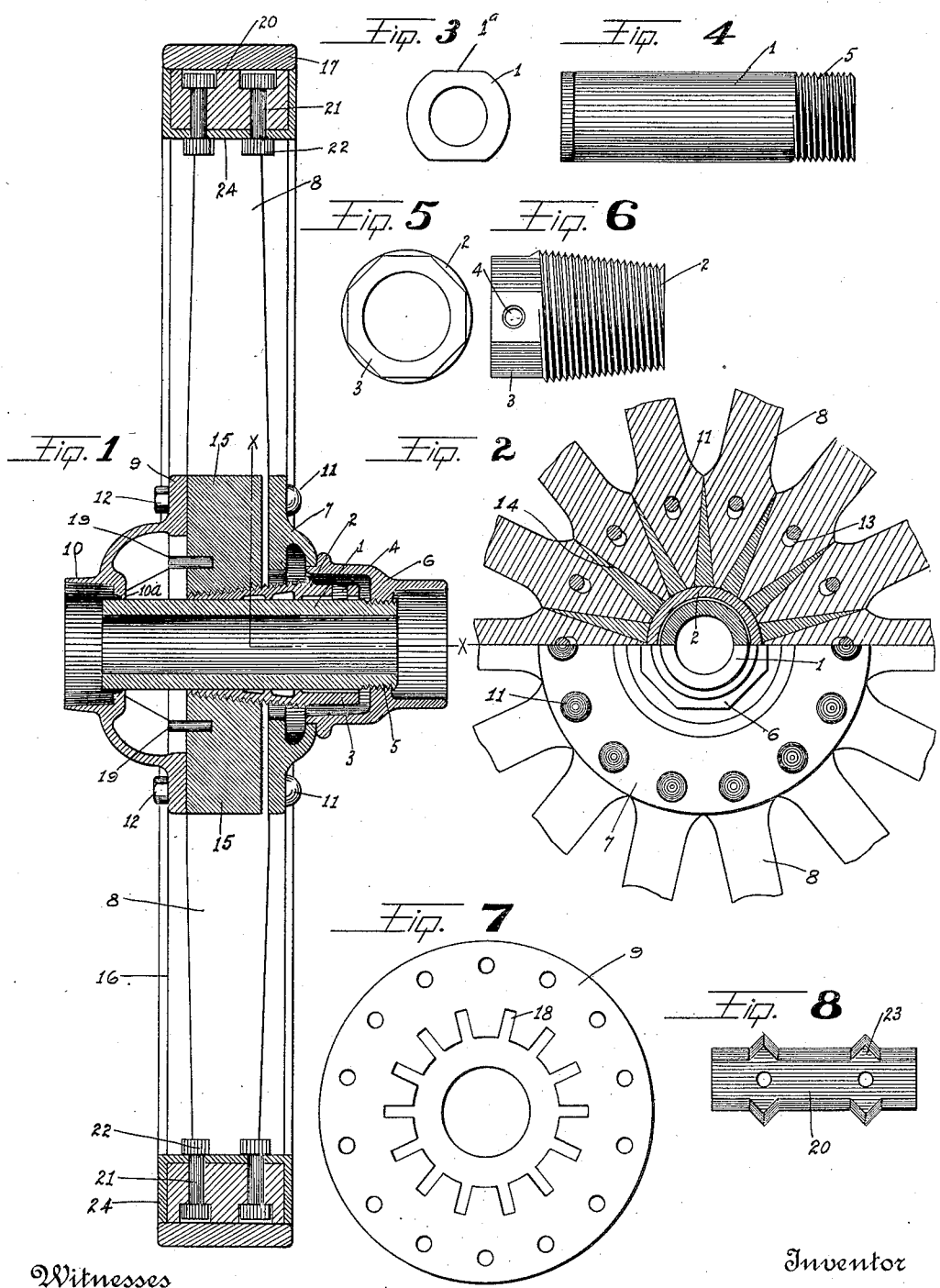
Witnesses
Clarence Smith
J. B. Webster
Inventor
C. L. Tomlinson
By Percy S. Webster
Attorney

UNITED STATES PATENT OFFICE.

CLARENCE L. TOMLINSON, OF PORTLAND, OREGON, ASSIGNOR TO NORTHWESTERN WHEEL & WAGON COMPANY, OF BELLINGHAM, WASHINGTON, A CORPORATION.

WHEEL.

1,057,300.  Specification of Letters Patent.  Patented Mar. 25, 1913.

Application filed April 3, 1912. Serial No. 688,297.

*To all whom it may concern:*

Be it known that I, CLARENCE L. TOMLINSON, a citizen of the United States, residing at Portland, in the county of Multnomah, State of Oregon, have invented certain new and useful Improvements in Wheels; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in wheels and the present application is directly applied as an improvement upon my Patent, No. 926,625.

The object of the present invention being to produce an improved means for driving the spokes of the wheel outward to tighten the rim which may do away with the gibs on the inside of the spokes as shown in said patent above mentioned and also to provide a more efficient, stronger and simpler construction generally than that set forth in said patent.

A further object of the invention is to produce a wedge shaped expander for the felly joints of the wheel in order to keep the felly tight and secure at all times.

A further object of the invention is to produce a simple and inexpensive device and yet one which will be exceedingly effective for the purposes for which it is designed.

These objects, I accomplish by means of such structure and relative arrangement of parts as will fully appear by a perusal of the following specification and claim.

In the drawings similar characters of reference indicate corresponding parts in the several views.

Figure 1 is a sectional view of my complete wheel. Fig. 2 is an end view of the hub portion of the wheel shown partly in section on a line X—X of Fig. 1. Fig. 3 is an end view of the axle box or journal. Fig. 4 is a side elevation of the same. Fig. 5 is an end view of a wedge shaped expanding cone. Fig. 6 is a side elevation of the same. Fig. 7 is an end view of a hub section. Fig. 8 is a bottom plan view of a wedge shaped expanding member for the felly joints.

Referring now more particularly to the characters of reference on the drawings, 1 designates an axle box or journal mounted on which is a tapered threaded expanding cone 2 having a square or octagonal end 3 to receive a wrench for the purpose of screwing it up as will hereinafter appear. Any fixed position of said cone 2 upon the member 1 may be had by means of the set screw 4 projecting through said cone 2 and adapted to impinge against said member 1. The end of the member 1 is threaded as at 5 to receive in a threaded manner one hub section 6 carrying a disk like portion 7 adapted to impinge against the spokes 8 and hold them in contact with a disk 9 on the other hub section 10, the same being joined by means of cross bolts 11 projecting through said members 7, 8 and 9 and provided with nuts 12, the said spokes 8 being provided with elongated slots 13 to permit of said spokes 8 moving over the bolts 11 as such spokes are expanded outwardly during the tightening operation. The spokes 8 are tapered at their lower ends as at 14 to receive expanding tapered members 15, the butt ends of which are inclined and threaded to receive the threaded expanding cone member 2, where by screwing the said cone member 2 it will force said spokes outward against the felly 16 and tighten the rim 17 on said felly. The disk like member 9 on the hub section 10 is provided with a plurality of slots 18 to receive pins 19 projecting outwardly from each one of the members 15. These pins hold the members 15 in position and prevent them from coming loose and unscrewed from the member 2. The member 1 has square shoulders 1ª which fit in corresponding square portions 10ª in the hub portion 10 which prevents said member 1 from becoming loosened until said hub portion 10 is removed.

In combination with the structure just described, I provide a means for tightening the felly 16 at its several joints, such means comprising a tapered wedge 20 adapted to fit between the joints of such felly 16 and provided with bolts 21 carrying nuts 22 whereby the wedge member 20 may be drawn down between the joints of the felly for expanding the outer periphery of the same and keep said felly tight and immovable. Said member 20 is provided with V-shaped side lugs 23 which project into the ends of the felly thereby preventing the same from having any lateral movement.

The numeral 24 designates a cap or clip that fits over the member 20 and over each end of the felly 16 at its joints through which member 24 the bolts 21 pass. Said caps prevent grit or dirt or any foreign matter from entering between the free ends of the felly at each joint.

From the foregoing description it will be readily seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

A device of the character described comprising an axle box, a tapered threaded expanding cone mounted on said axle box, a plurality of spokes provided with a felly, the inner ends of said spokes being tapered, tapered expanding members between the tapered ends of said spokes, the butt ends of said expanding members being inclined and threaded to engage said expanding cone, and a hub for receiving said spokes, as described.

In testimony whereof I affix my signature in presence of two witnesses.

CLARENCE L. TOMLINSON.

Witnesses:
J. M. LONG,
RUTH M. JONES.

---

Copies of this patent may be obtained for five cents each, by addressing the "Commissioner of Patents, Washington, D. C."